(12) United States Patent
Nam et al.

(10) Patent No.: US 10,506,259 B2
(45) Date of Patent: Dec. 10, 2019

(54) METHOD FOR ENCODING/DECODING IMAGE, AND DEVICE THEREFOR

(71) Applicant: LG ELECTRONICS INC., Seoul (KR)

(72) Inventors: Junghak Nam, Seoul (KR); Chulkeun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/736,234

(22) PCT Filed: Jun. 14, 2016

(86) PCT No.: PCT/KR2016/006287
§ 371 (c)(1),
(2) Date: Dec. 13, 2017

(87) PCT Pub. No.: WO2016/204479
PCT Pub. Date: Dec. 22, 2016

(65) Prior Publication Data
US 2018/0199069 A1    Jul. 12, 2018

Related U.S. Application Data

(60) Provisional application No. 62/180,070, filed on Jun. 16, 2015.

(51) Int. Cl.
H04N 19/70    (2014.01)
H04N 19/176   (2014.01)
(Continued)

(52) U.S. Cl.
CPC .......... *H04N 19/70* (2014.11); *H04N 19/117* (2014.11); *H04N 19/136* (2014.11); *H04N 19/174* (2014.11); *H04N 19/176* (2014.11); *H04N 19/1883* (2014.11); *H04N 19/44* (2014.11); *H04N 19/82* (2014.11); *H04N 19/91* (2014.11); *H04N 19/119* (2014.11); *H04N 19/96* (2014.11)

(58) Field of Classification Search
CPC ...... H04N 19/70; H04N 19/176; H04N 19/96; H04N 19/117; H04N 19/91; H04N 19/44
See application file for complete search history.

(56) References Cited

U.S. PATENT DOCUMENTS

2009/0175349 A1* 7/2009 Ye ................... H04N 19/70
                                            375/240.23
2012/0177107 A1   7/2012 Fu et al.
(Continued)

FOREIGN PATENT DOCUMENTS

KR    1020130098481 A    9/2013
KR    1020150041767 A    4/2015

*Primary Examiner* — Shawn S An
(74) *Attorney, Agent, or Firm* — Dentons US LLP

(57) ABSTRACT

Disclosed are a method for encoding/decoding an image, and a device therefor. Specifically, the present invention comprises: a step of parsing, from a bit stream outputted from an encoder, a sample adaptive offset (SAO) in first block units in which the SAO is transmitted; a step of obtaining a reconstructed picture from the bit stream; and a step of summing combining the SAO, parsed to each pixel in the first block units from the reconstructed picture, wherein the first block units may be variably determined by the encoder.

8 Claims, 7 Drawing Sheets

(51) Int. Cl.
*H04N 19/117* (2014.01)
*H04N 19/44* (2014.01)
*H04N 19/91* (2014.01)
*H04N 19/136* (2014.01)
*H04N 19/174* (2014.01)
*H04N 19/82* (2014.01)
*H04N 19/169* (2014.01)
H04N 19/96 (2014.01)
H04N 19/119 (2014.01)

(56) References Cited

U.S. PATENT DOCUMENTS

| | | | |
|---|---|---|---|
| 2013/0022113 A1* | 1/2013 | Chen | H04N 19/597 375/240.12 |
| 2013/0077697 A1 | 3/2013 | Chen et al. | |
| 2013/0114678 A1 | 5/2013 | Baylon et al. | |
| 2013/0177068 A1* | 7/2013 | Minoo | H04N 19/117 375/240.02 |
| 2015/0264406 A1* | 9/2015 | Kim | H04N 19/182 375/240.29 |
| 2015/0341674 A1* | 11/2015 | Seregin | H04N 19/105 375/240.12 |
| 2016/0219302 A1* | 7/2016 | Liu | H04N 19/583 |
| 2016/0234495 A1* | 8/2016 | Wennersten | H04N 19/176 |

* cited by examiner (A)            (B)

Intra:

2Nx2N       NxN

Inter:

2Nx2N     NxN     2NxN     Nx2N nLx2N     nRx2N     2NxnU     2NxnD

FIG. 5

| A SAO off | B SAO on | C SAO on | D SAO off |
| E SAO off | F SAO on | G SAO on | H SAO on |
| I SAO on | J SAO off | K SAO on | L SAO off |

FIG. 6

METHOD FOR ENCODING/DECODING IMAGE, AND DEVICE THEREFOR

CROSS-REFERENCE TO RELATED APPLICATIONS

This application is the National Stage filing under 35 U.S.C. 371 of International Application No. PCT/KR2016/006287, filed on Jun. 14, 2016, which claims the benefit of U.S. Provisional Application No. 62/180,070, filed on Jun. 16, 2015, the contents of which are all hereby incorporated by reference herein in their entirety.

TECHNICAL FIELD

The present invention relates to a method for processing a moving image and more specifically, a method for applying a loop filter to a reconstructed image or a method for transmitting and/or applying a Sample Adaptive Offset (SAO) in block units of variable size when the SAO is applied to a reconstructed image and a device supporting the method.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

SUMMARY OF INVENTION

Technical Problem

An object of the present invention is to provide a method for transmitting an SAO in block units of variable size when the SAO is applied to a reconstructed image.

Also, an object of the present invention is to provide a method for applying an SAO in block units of variable size when the SAO is applied to a reconstructed image.

The objects of the present invention are not limited to the technical objects described above, and other technical that are objects not mentioned herein may be understood to those skilled in the art from the description below.

Technical Solution

According to one aspect of the present invention, a method for decoding an image comprises parsing, from a bit stream outputted from an encoder, a Sample Adaptive Offset (SAO) in first block units in which the SAO is transmitted, obtaining a reconstructed picture from the bit stream, and summing the SAO parsed to each pixel in the first block units for the reconstructed picture, wherein the first block unit is determined variably by the encoder.

According to one aspect of the present invention, a device decoding an image may comprise an entropy decoding unit parsing, from a bit stream outputted from an encoder, a Sample Adaptive Offset (SAO) in first block units in which the SAO is transmitted, a reconstructing unit obtaining a picture reconstructed from the bit stream, and a filtering unit summing the SAO parsed to each pixel in the first block units for the reconstructed picture, wherein the first block unit is determined variably by the encoder.

Preferably, the method may further comprise parsing information about the first block unit from the bit stream.

Preferably, the first block unit may be determined separately for each picture or slice.

Preferably, information about the first block unit may be transmitted from within a slice header, picture parameter set (PPS), sequence parameter set (SPS), or video parameter set (VPS).

Preferably, the first block unit may be determined separately for each second block of a predetermined size to which a picture or a slice is partitioned.

Preferably, information about the first block unit may be transmitted in units of the second block.

Preferably, the method may further comprise parsing a flag indicating whether the first block unit is determined in units of picture or slice, and the first block unit may be determined separately for each picture or slice according to the flag value or determined separately for each second block of a predetermined size by which a picture or a slice is partitioned.

Preferably, the method may further comprise parsing, from the bit stream, information about a third block unit in which the SAO can be transmitted, and if the size of an encoding unit within the reconstructed image is equal to or smaller than the size of the third block unit, the third block unit is determined as the first block unit; otherwise, the encoding unit is determined as the first block unit.

Advantageous Effects

According to an embodiment of the present invention, when a sample adaptive offset (SAO) is applied to a reconstructed image, signaling overhead is reduced by transmitting the SAO in block units of variable size, eventually improving compression performance.

Also, according to an embodiment of the present invention, when a sample adaptive offset (SAO) is applied to a reconstructed image, image quality of a reconstructed image may be improved by applying the SAO in block units of variable size.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 5 is an embodiment to which the present invention is applied and illustrates a case in which a sample adaptive offset is transmitted at the level of coding tree unit.

FIG. 6 illustrates a method for transmitting an SAO in a variable block unit according to one embodiment of the present invention.

BEST MODE

Figure 1:
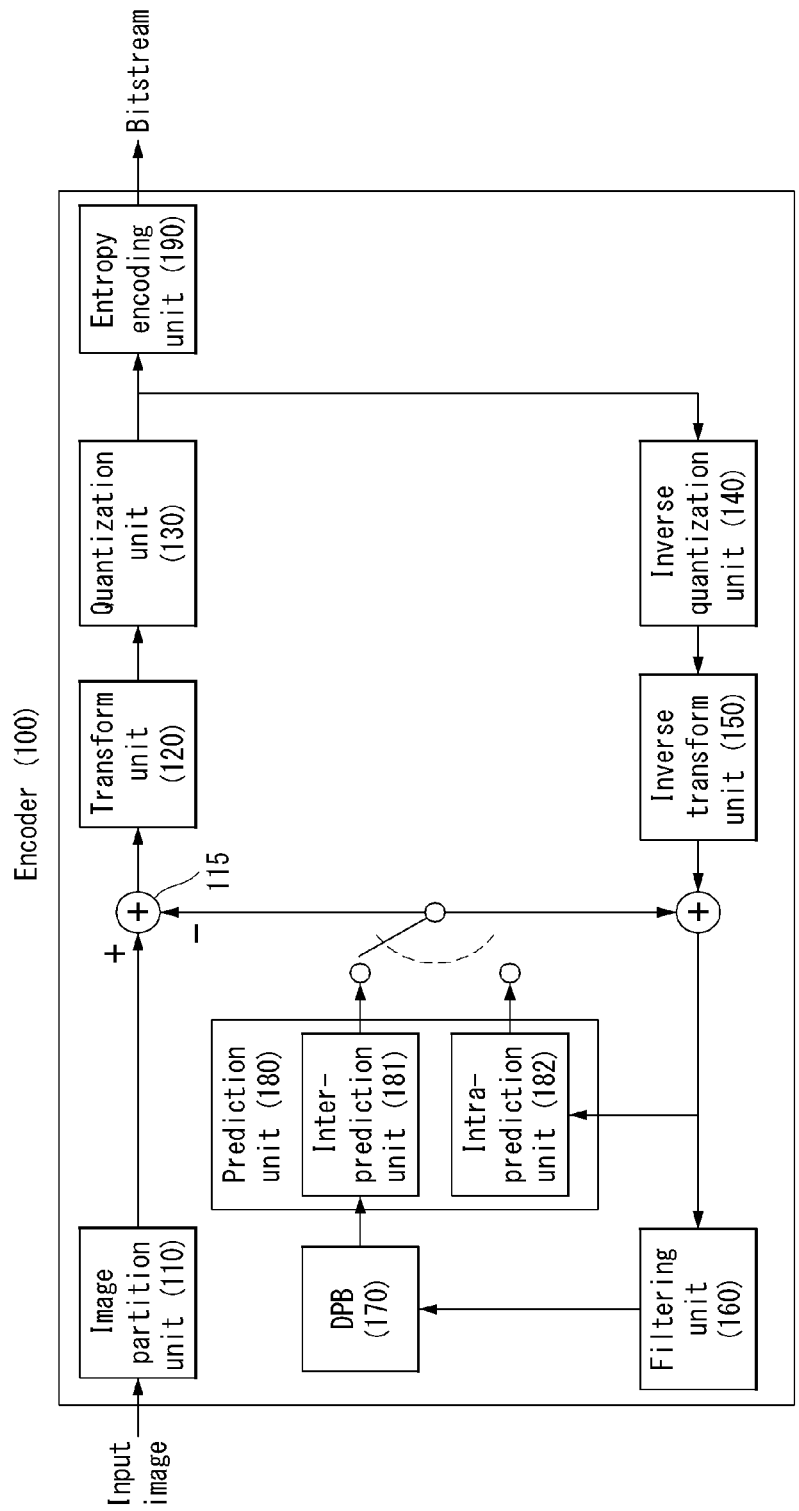
FIG. 1 is an embodiment to which the present invention is applied and illustrates a block diagram of an encoder that encodes a still image or a moving image signal.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

In what follows, a 'block' or a 'unit' appearing in this document refers to a unit that performs a process of encoding/decoding such as prediction, transformation and/or quantization and may comprise a multi-dimensional array of samples (or pixels).

A 'block' or a 'unit' may indicate a multi-dimensional array of samples of luma component or may indicate a multi-dimensional array of samples of chroma component. Also, a multi-dimensional array of samples of the luma component and a multi-dimensional array of samples of the chroma component may be called collectively a 'block' or a 'unit'.

For example, a 'block' or a 'unit' may be interpreted to include all of a coding block (CB) indicating an array of target samples of encoding/decoding, a coding tree block (CTB) consisting of a plurality of coding blocks, a prediction block (PB) (or a prediction unit (PU)) indicating an array of samples for which the same prediction is applied, and a transform block (TB) (or a transform unit (TU)) indicating an array of samples for which the same transformation is applied.

Also, unless otherwise mentioned specifically, a 'block' or a 'unit' may be interpreted to include a syntax structure used in a process of encoding/decoding an array of samples with respect to luma and/or chroma component. Here, the syntax structure indicates zero or more syntax elements found in a bitstream according to a specific order, and the syntax element indicates an element of data expressed within a bit stream.

For example, a 'block' or a 'unit' may be interpreted to include all of a coding unit (CU) including a coding block (CB) and a syntax structure used for encoding of the corresponding coding block (CB), a coding tree unit (CTU) comprising a plurality of coding units, a prediction unit (PU) including a prediction block (PB) and a syntax structure used for prediction of the corresponding prediction block (PB), and a transform unit (TU) including a transform block (TB) and a syntax structure used for transformation of the corresponding transform block (TB).

Also, in this document, a 'block' or a 'unit' is not necessarily limited to an array of square or rectangular shaped samples (or pixels) but may indicate an array of samples (or pixels) in the form of polygon having three or more vertices. In this case, the 'block' or the 'unit' may be called a polygon block or a polygon unit.

FIG. 1 is an embodiment to which the present invention is applied and illustrates a block diagram of an encoder that encodes a still image or a moving image signal.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 partitions an input video signal (or picture or frame) input to the encoder 100 into one or more blocks.

The subtract unit 115 subtracts a predicted signal (or predicted block) outputted from the prediction unit 180 (namely inter-prediction unit 181 or intra-prediction unit 182) from the input video signal and generates a residual signal (or a residual block). The generated residual signal (or residual block) is transmitted to the transform unit.

The transform unit 120 generates transform coefficients by applying a transform technique (for example, DCT (Discrete Cosine Transform), DST (Discrete Sine Transform), GBT (Graph-Based Transform), and KLT (Karhunen-Loeve Transform)) to a residual signal (or a residual block). At this time, the transform unit 120 may generate transform coefficients by performing transformation by using the transform technique determined according to the prediction mode applied to the residual block and the residual block size.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, a quantized signal outputted from the quantization unit 130 may be used for generating a prediction signal. For example, a quantized signal may reconstruct a residual signal by applying dequantization and inverse transform through the dequantization unit 140 and the inverse transform unit 150 within a loop. By adding the reconstructed residual signal to the prediction signal outputted from the inter-prediction unit 181 or the intra-prediction unit 182, a reconstructed signal (or reconstructed block) may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy.

Here, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels.

The intra-prediction unit 182 predicts a current block by referring to the samples in the vicinity of a block to be encoded. The intra-prediction unit 182 may perform the following process to perform intra-prediction. First, the intra-prediction unit 182 may prepare for reference samples required to generate a prediction signal. And the intra-prediction unit 182 may generate a predicted signal (predicted block) by using the prepared reference samples. Afterwards, the predicted mode is encoded. At this time, reference samples may be prepared through reference sample padding and/or reference sample filtering. A quantization error may be developed since reference samples go through the prediction and reconstruction process. Therefore, to reduce the error, a reference sample filtering process may be performed for each prediction mode used for intra-prediction.

The predicted signal (or predicted block) generated through the inter-prediction unit 181 or the intra-prediction unit 182 may be used for generating a reconstruction signal (or reconstruction block) or for generating a residual signal (or residual block).

Figure 2:
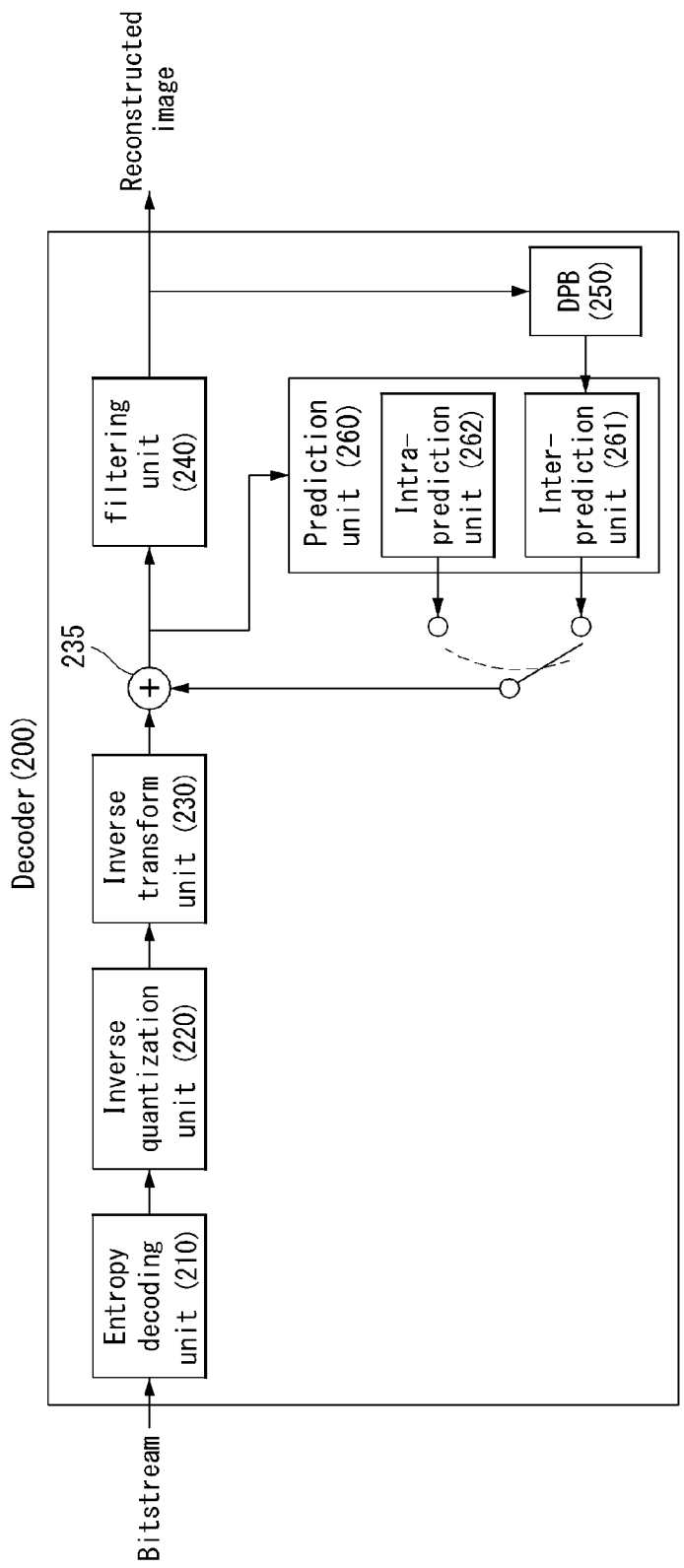
FIG. 2 is an embodiment to which the present invention is applied and illustrates a block diagram of a decoder that decodes an encoded still image or moving image signal.

FIG. 2 is an embodiment to which the present invention is applied and illustrates a block diagram of a decoder that encodes a still image or a moving image signal.

Referring to FIG. 2, a decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients by applying an inverse transform technique.

The add unit 235 generates a reconstructed signal (or reconstructed block) by adding the obtained residual signal (or residual block) to the predicted signal (or predicted block) outputted from the prediction unit 260 (or inter-prediction unit 261 or intra-prediction unit 262).

The filtering unit 240 applies filtering to the reconstructed signal (or reconstructed block) and outputs the filtered signal to a playback device or transmit the filtered signal to the decoded picture buffer 250. The filtered signal transmitted to the decoded picture buffer 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Block Partition Structure

Generally, the block-based image compression method is used in the compression technique (e.g., HEVC) of a still image or a video. The block-based image compression method is a method of processing an image by partitioning it into a specific block unit, and may decrease the use of memory and the amount of operation.

Figure 3:
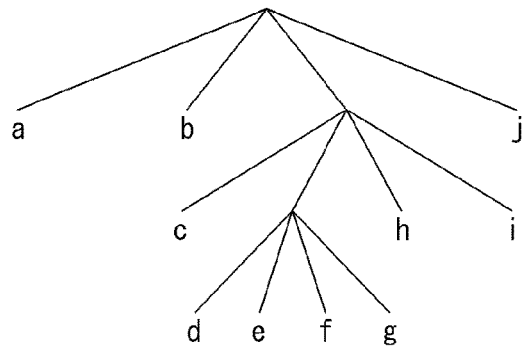
FIG. 3 illustrates a partition structure of a coding unit to which the present invention may be applied.
Figure 3:
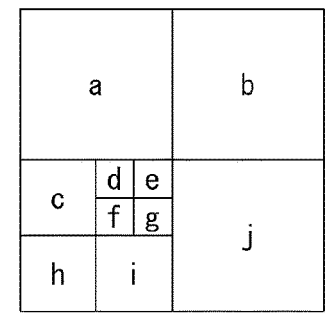

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be divided into a quadtree structure. In other words, while maintaining the square shape, one CTU is divided into four units, each of which having half horizontal size and half vertical size, forming a coding unit (CU). The aforementioned division into the quadtree structure may be performed recursively. In other words, a CU is divided hierarchically from one CTU into the quadtree structure.

A CU refers to a processing step of an input image, for example, a basic unit of coding in which intra/inter-prediction is performed. A CU comprises a coding block (CB) for the luma component and a CB for two chroma components corresponding to the CB for the luma component. In the HEVC, the size of the CU may be determined by one of 64×64, 32×32, 16×16, and 8×8.

Referring to FIG. 3, the root node of the quadtree is associated with the CTU. The quadtree is subdivided until it reaches a leaf node, where a leaf node corresponds to the CU.

More specifically, the CTU corresponds to the root node and has the smallest depth (namely depth=0). Depending on the characteristics of an input image, the CTU may not be subdivided, where, in this case, the CTU corresponds to the CU.

The CTU may be subdivided in the form of quadtree, and as a result, lower nodes having the depth of 1 (depth=1) are generated. And of the lower nodes having the depth of 1, a node that is not subdivided further (namely a leaf node) corresponds to the CU. For example, in FIG. 3(b), CU(a), CU(b), and CU(j) corresponding to the node a, b, and j have been subdivided once from the CTU and have the depth of 1.

Of the nodes having the depth of 1, at least one may be subdivided again in the form of quadtree and as a result, lower nodes having the depth of 1 (namely depth=2) are generated. And from among the lower nodes having the depth of 2, the node that is not subdivided further (namely leaf node) corresponds to the CU. For example, in FIG. 3(b), CU(c), CU(h), and CU(i) corresponding to the node c, h, and i have been subdivided twice from the CTU and have the depth of 2.

Also, from among the nodes having the depth of 2, at least one may be subdivided again in the form of quadtree and as a result, lower nodes having the depth of 3 (namely depth=3) are generated. And among the lower nodes having the depth of 3, a node that is not subdivided further (namely leaf node) corresponds to the CU. For example, in FIG. 3(b), CU(d), CU(e), CU(f), and CU(g) corresponding to the node d, e, f, and g have been subdivided three times from the CTU and have the depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quadtree shape, the size of SCU may be obtained by using a size of LCU and the maximum depth information. Or, inversely, the size of LCU may be obtained by using a size of SCU and the maximum depth information of the tree.

For each CU, information indicating whether the corresponding CU is split (for example, split_cu_flag) may be delivered to the decoder. This split mode is included in all of CUs except for the SCU. For example, if the flag indicating whether to split is '1', the corresponding CU is split again into four CUs. If the flag indicating whether to split is '0', the corresponding CU is not split further, and processing of the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quadtree structure, but is partitioned once in a single CU in a predetermined shape. This will be described by reference to the drawing below.

Figure 4:
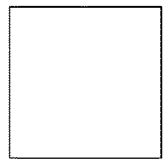
FIG. 4 illustrates a prediction unit to which the present invention may be applied.
Figure 4:
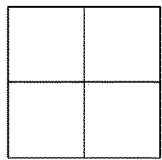
Figure 4:
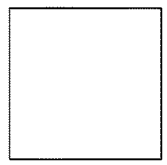
Figure 4:
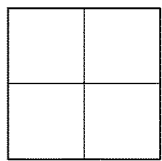
Figure 4:
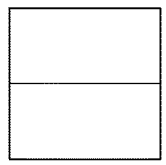
Figure 4:
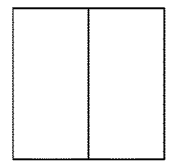
Figure 4:
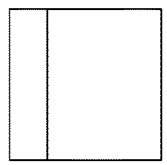
Figure 4:
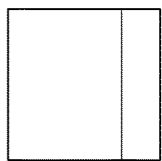
Figure 4:
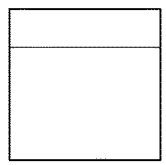
Figure 4:
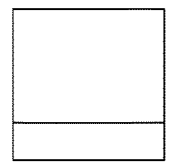

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the dequantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, the prediction mode is selected for each PU unit, and for the selected prediction mode, prediction and reconfiguration are performed on the basis of an actual TU unit.

A TU refers to a basic unit in which actual prediction and reconfiguration are performed. The TU includes a transform block (TB) for the luma component and a TB for two chroma components corresponding to the TB for the luma component.

Like the example of FIG. 3 in which one CTU is subdivided into the quadtree structure to form a CU, the TU is subdivided into the quadtree structure hierarchically from one CU to be coded.

Since the TU is split into the quadtree structure, the TU split from a CU may be split further down to a smaller sub-TU. In the HEVC, the size of the TU may be determined by one of 32×32, 16×16, 8×8, and 4×4.

Referring again to FIG. 3, it is assumed that the root node of the quadtree is associated with the CU. The quadtree is subdivided until it reaches a leaf node, where the leaf node corresponds to the TU.

More specifically, the CU corresponds to the root node and has the smallest depth (namely depth=0). The CU may not be subdivided depending on the characteristics of an input image, where, in this case, the CU corresponds to the TU.

The CU may be subdivided in the form of quadtree and as a result, lower nodes having the depth of 1 (depth=1) are generated. And among the lower nodes having the depth of 1, the node that are not subdivided further (namely leaf node) corresponds to the TU. For example, in FIG. 3(*b*), TU(a), TU(b), and TU(j) corresponding to the node a, b, and j have been subdivided once from the CU and have the depth of 1.

Of the nodes having the depth of 1, at least one may be subdivided again in the form of quadtree and as a result, lower nodes having the depth of 1 (namely depth=2) are generated. And from among the lower nodes having the depth of 2, the node that is not subdivided further (namely leaf node) corresponds to the TU. For example, in FIG. 3(*b*), TU(c), TU(h), and TU(i) corresponding to the node c, h, and i have been subdivided twice from the CU and have the depth of 2.

Also, from among the nodes having the depth of 2, at least one may be subdivided again in the form of quadtree and as a result, lower nodes having the depth of 3 (namely depth=3) are generated. And among the lower nodes having the depth of 3, a node that is not subdivided further (namely leaf node) corresponds to the TU. For example, in FIG. 3(*b*), TU(d), TU(e), TU(f), and TU(g) corresponding to the node d, e, f, and g have been subdivided three times from the CU and have the depth of 3.

A TU having the tree structure may be subdivided hierarchically with predetermined maximum depth information (or maximum level information). And each subdivided TU may have depth information. Since the depth information represents the number of subdivisions of the TU and/or the degree of subdivisions, the depth information may include information about the size of the TU.

For each TU, information indicating whether the corresponding TU is split (for example, split_transform_flag) may be delivered to the decoder. This subdivision information is included in all of TUs except for the TU having the smallest size. For example, if the flag indicating whether to split is '1', the corresponding TU is split again into four TUs. If the flag indicating whether to split is '0', the corresponding TU is not split further.

In-Loop Filtering

The filtering unit (160 in the case of FIG. 1, 240 in the case of FIG. 2) performs deblocking filtering for removing blocking artifacts and applies a sample adaptive offset (SAO) for compensating for information loss due to lossy compression such as quantization. By doing so, the filtering unit may improve compression efficiency as well as subjective image quality.

HEVC employs an inloop deblocking filter similar to H.264/AVC. HEVC defines various blocks such as CU, PU, and TU, allowing various block boundaries. In HEVC, deblocking filtering is applied by combining all of the block boundaries except for the boundary between 4×4 blocks. For each boundary, whether to apply deblocking and whether to apply strong or weak filtering is determined. Decisions may be made according to the gradient between bidirectional pixel values with respect to the boundary and quantization parameters (QPs) within blocks.

SAO has been newly adopted in the HEVC. SAO is used to classify pixels into different categories, and an offset value is added to each pixel (namely individual pixels within a picture to which a deblocking filter is applied) according to the respective categories.

At this time, the encoder calculates an offset value for compensating for the error between the reconstructed image and the original image and transmits the calculated offset value to the decoder. If the offset value is transmitted for each pixel, signaling overhead is increased due to the transmission; thus, in HEVC, the offset value is transmitted in the units of CTU. In other words, in HEVC, SAO is performed in the units of CTU.

In HEVC, an encoder may determine whether to use SAO, whether to apply an edge offset (EO), and whether to apply a band offset (BO) by taking into account the pixel characteristics within the corresponding CTU with respect to the current CTU, after which the decisions made may be transmitted for each CTU.

BO is used for compensating for an error in a specific brightness range, and EO is used for compensating for an error in a pixel along a specific edge direction.

If EO is used for a CTU, information about which class is used for the corresponding CTU is additionally transmitted to the decoder. Here, a class refers to one of four different, one-dimensional three pixel patterns used for classifying pixels according to edge direction of each pixel. A total of four patterns (namely classes) are used, such as the (horizontal) pattern of $\{(x-1, y), (x, y), (x+1, y)\}$, the (vertical) pattern of $\{(x, y-1), (x, y), (x, y+1)\}$, the (45 degree class) pattern of $\{(x-1, y+1), (x, y), (x+1, y-1)\}$ and the (135 degree class) pattern of $\{(x-1, y-1), (x, y), (x+1, y+1)\}$. In other words, the encoder determines a specific class by finding which class of the four classes for each CTU maximizes the performance of the EO, and transmits the determined class information to the decoder.

And the encoder/decoder calculates the category for each pixel for which filter is performed within the corresponding CTU by using the corresponding pixel value and neighbor pixel values. At this time, as described above, neighbor pixels used for calculating the category according to the class of the CTU is determined. Each pixel may be classified to a first category (when the current pixel value is larger than the values of two neighbor pixels), a second category (when the current pixel value is smaller than the values of two neighbor pixels), a third category (when the current pixel value is equal to either of the values of two neighbor pixels), or a fourth category (other cases).

The encoder may determine the offset value for each category and send the determined offset value to the decoder. The decoder may calculate the category for each pixel and adds the offset value corresponding to the category, received from the encoder, to the corresponding reconstructed pixel, thereby completing performing the SAO.

When BO is used for the CTU, the encoder classifies all of the pixels within the CTU as belonging to one of multiple bands according to their pixel values. When an input image has an 8-bit depth, the intensity value ranges from 0 to the maximum intensity of 255, the whole range being divided by 32 equal segments (namely bands). In this case, each band has an 8-bit width.

The encoder transmits, to the decoder, an offset value for four consecutive bands from among the 32 bands. At this time, the encoder also transmits, to the decoder, information about the start position of a band to which a band offset is transmitted.

After mapping each pixel within the CTU to the band to which the pixel value of which belongs, the decoder adds a band offset value corresponding to the mapped band. At this time, the offset value of a band to which an offset value is not transmitted is regarded as zero.

As described above, by compensating for the distortion, caused by the difference between the original image and the reconstructed image generated during an encoding process such as quantization, by applying an offset in units of samples, subjective image quality and encoding efficiency may be expected to be improved.

FIG. 5 is an embodiment to which the present invention is applied and illustrates a case in which a sample adaptive offset is transmitted at the level of coding tree unit.

Referring to FIG. 5, whether SAO is applied (SAO on) in units of CTUs or no (SAO off) may be determined.

In other words, the SAO value (for example, the absolute value and sign of the SAO) may be signaled from the encoder to the decoder in units of CTUs for which SAO is applied.

Method for Transmitting/Applying SAO in Units of Variable Block Units

Since the next-generation video contents have a video resolution of 4K or 8K, the CTU size used in the video codec is likely to increase. For example, a 512×512 or 256×256 block may be used as the default CTU size.

As described above, transmission of SAO with a fixed CTU unit has a problem of degrading the performance of the SAO. In a large block, precision of the adaptive offset is degraded, and there may be various edge directions within one CTU block.

In this regard, the present invention proposes a method for determining the application unit of SAO variably and transmitting the SAO in block units of variable size when the SAO is applied to an image to which a deblocking filter has been applied.

In what follows, in describing the present invention, the edge offset and/or band offset is collectively referred to as SAO.

Also, in what follows, for the convenience of description, the present invention is described on the basis of the CTU (or CTB) and/or CU (or CB), which is only an example and the present invention is not limited to the descriptions given.

Embodiment 1

According to one embodiment of the present invention, the block unit in which SAO is transmitted may be determined in units of slices (or pictures). In other words, the encoder may transmit information about the block unit in which SAO is transmitted in units of slices or pictures to the decoder.

At this time, the encoder may transmit, to the decoder, information about the block unit in which SAO is transmitted in terms of depth by which a picture or slice is divided into a block of a predetermined size (for example, CTU/CTB or CU/CB).

At this time, the information about the block unit in which SAO is transmitted may be transmitted from a slice header, picture parameter set (PPS), sequence parameter set (SPS), or video parameter set (VPS). This implies that the block unit in which SAO is transmitted may be determined in units of a slice, picture, sequence, or video.

The slice header refers to a slice segment header of an independent slice segment, where an independent slice segment refers to a current slice segment or the most recent, independent slice segment preceding a current dependent slice segment according to a decoding order.

The picture parameter set (PPS) refers to the syntax structure including syntax elements applied to zero or more coded pictures determined by the syntax elements obtained within each slice segment header.

The sequence parameter set (SPS) refers to the syntax structure including syntax elements applied to zero or more coded video sequences (CVSs) determined by the content of syntax elements obtained within the PPS referenced by the syntax element obtained within each slice segment header.

The video parameter set (VPS) refers to the syntax structure including syntax elements applied to zero or more CVSs determined by the content of syntax elements obtained within the SPS referenced by the syntax element obtained within the PPS referenced by the syntax element obtained within each slice segment header.

Table 1 illustrates syntax for transmitting SAO in block units of variable size according to one embodiment of the present invention.

TABLE 1

| slice_segment_header( ) { | Descriptor |
|---|---|
| ... | |
| sao_control_depth | ue(v) |
| ... | |

Table 1 illustrates a case in which the slice segment header transmits information about block unit in which SAO is transmitted.

Referring to Table 1, SAO control depth (sao_control_depth) transmitted from the slice header describes the syntax of how SAO is transmitted in units of slices. In other words, SAO control depth (sao_control_depthG25) may specify the block unit in which SAO is transmitted.

If the SAO control depth (sao_control_depth) is zero, SAO is applied in units of CTUs, the largest block unit for encoding. In other words, SAO may be transmitted in units of CTUs.

If the SAO control depth (sao_control_depth) is 1, SAO may be transmitted in four block units divided from the CTU in the form of quadtree.

Also, if the SAO control depth (sao_control_depth) is 2, SAO may be transmitted in smaller block units divided again from the four blocks in the previous step in the form of quadtree. In other words, SAO may be transmitted in 16 sub-block units with respect to the CTU.

At this time, the SAO control depth (sao_control_depth) syntax element may have the value equal to the predefined minimum CU.

Meanwhile, in Table 1, the SAO control depth (sao_control_depth) is only an example of a syntax element indicating the block unit in which SAO is transmitted, and it should be understood that a different name may be used for sao_control_depth.

FIG. 6 illustrates a method for transmitting an SAO in a variable block unit according to one embodiment of the present invention.

FIG. 6 illustrates a method for transmitting a variable SAO by using the SAO control depth (sao_control_depth) and assumes that the SAO control depth (sao_control_depth) is 1.

In FIGS. 6, A, B, C, D, E, F, G, H, I, J, K, and L represent CTUs. Also, in FIG. 6, the shaded blocks represent the blocks for which the SAO is applied whereas those blocks not shaded represent the blocks for which the SAO is not applied.

Since the present example assumes that the SAO control depth (sao_control_depth) is 1, each CTU is subdivided into four sub-blocks in the form of quadtree, and the SAO may be transmitted to each sub-block.

Figure 7:
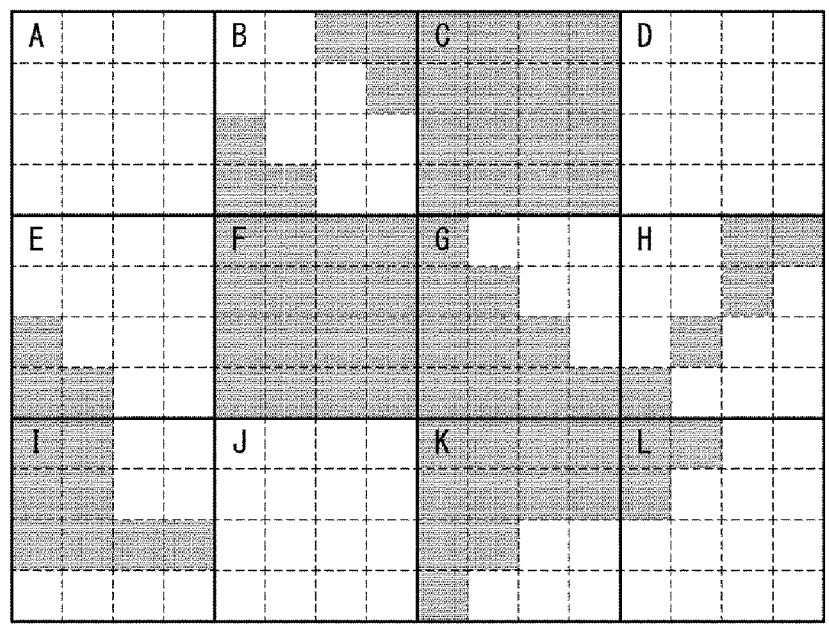
FIG. 7 illustrates a method for transmitting an SAO in a variable block unit according to one embodiment of the present invention.

FIG. 7 illustrates a method for transmitting an SAO in a variable block unit according to one embodiment of the present invention.

FIG. 7 illustrates a method for transmitting a variable SAO by using the SAO control depth (sao_control_depth) and illustrates a case in which the SAO control depth (sao_control_depth) is 2.

In FIGS. 7, A, B, C, D, E, F, G, H, I, J, K, and L represent CTUs. Also, in FIG. 7, the shaded blocks represent the blocks for which the SAO is applied whereas those blocks not shaded represent the blocks for which the SAO is not applied.

Since the present example assumes that the SAO control depth (sao_control_depth) is 2, each CTU is subdivided into four sub-blocks in the form of quadtree, and each block is further subdivided into four sub-blocks in the form of quadtree. In other words, the CTU is subdivided into 16 sub-blocks. The SAO may be transmitted to each sub-block.

According to the present invention, as shown in FIGS. 6 and 7, if the SAO is transmitted at the sub-block level, the SAO may be applied at a smaller block scale, thereby improving accuracy or performance of the SAO. Therefore, the error between the images before and after the SAO is applied (namely between the original and the reconstructed images) may be considerably reduced, and thereby image quality is improved accordingly.

However, since the SAO is transmitted in a smaller block unit, signaling overhead may be increased.

Since the SAO is not applied for the entire sub-blocks of A, D, and J block of FIG. 7 even if the SAO is transmitted in a smaller block unit, it is efficient for this case to transmit the SAO in a larger block unit.

Similarly, the SAO is applied for the entire sub-blocks of C and F block irrespective of the block size. Therefore, it may also be effective for this case to apply the SAO in a larger block unit than in a smaller block unit.

Embodiment 2

According to one embodiment of the present invention, the block unit in which SAO is transmitted may be determined in units of blocks of a predetermined size (for example, CTU/CTB or CU/CB) to which a slice or picture is divided. The encoder may transmit information about the block unit in which SAO is transmitted in units of blocks of a predetermined size (for example, CTU/CTB or CU/CB) to which a slice or a picture is divided.

At this time, the encoder may transmit, to the decoder, information about the block unit in which SAO is transmitted in terms of depth by which a slice or picture is divided into a block of a predetermined size (for example, CTU/CTB or CU/CB).

Table 2 illustrates syntax for transmitting SAO in block units of variable size according to one embodiment of the present invention.

TABLE 2

| coding_tree_unit( ) { | Descriptor |
|---|---|
| ... | |
| sao_control_cu_depth | ue(v) |
| ... | |

Referring to Table 2, SAO control CU depth (sao_control_cu_depth) transmitted from the CTU describes the syntax of how SAO is transmitted in units of CTUs. In other words, SAO control CU depth (sao_control_cu_depth) may specify the block unit in which SAO is transmitted.

If the SAO control CU depth (sao_control_cu_depth) is zero, SAO is applied in units of CTUs, the largest block unit for encoding. In other words, SAO may be transmitted in units of CTUs.

If the SAO control CU depth (sao_control_cu_depth) is 1, SAO may be transmitted in four block units divided from the CTU in the form of quadtree.

Also, if the SAO control CU depth (sao_control_cu_depth) is 2, SAO may be transmitted in smaller block units divided again from the four blocks in the previous step in the form of quadtree. In other words, SAO may be transmitted in 16 sub-block units with respect to the CTU.

At this time, the SAO control CU depth (sao_control_cu_depth) syntax element may have the value equal to the predefined minimum CU.

Meanwhile, in Table 2, the SAO control CU depth (sao_control_cu_depth) is only an example of a syntax element indicating the block unit in which SAO is transmitted, and it should be understood that a different name may be used for sao_control_depth.

Figure 8:
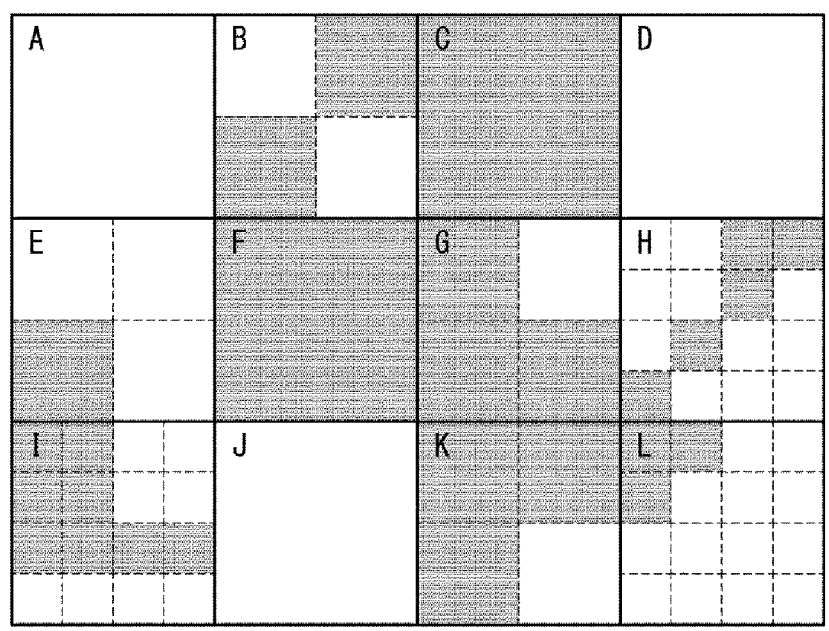
FIG. 8 illustrates a method for transmitting an SAO in variable block units according to one embodiment of the present invention.

FIG. 8 illustrates a method for transmitting an SAO in variable block units according to one embodiment of the present invention.

FIG. 8 illustrates a method for transmitting a variable SAO by using the SAO control CU depth (sao_control_cu_depth). In other words, the SAO control CU depth (sao_control_cu_depth) value may be used to define (or indicate) a block unit in which the SAO is transmitted for each CTU.

In FIGS. 8, A, B, C, D, E, F, G, H, I, J, K, and L represent CTUs. Also, in FIG. 8, the shaded blocks represent the blocks for which the SAO is applied whereas those blocks not shaded represent the blocks for which the SAO is not applied.

In FIG. 8, the SAO control CU depth (sao_control_cu_depth) is 0 for A, C, D, F, and J blocks; the SAO control CU depth (sao_control_cu_depth) is 1 for B, E, G, and K blocks; and the SAO control CU depth (sao_control_cu_depth) is 2 for H, I, and L blocks.

As described above, for those blocks with similar SAO characteristics, the sample adaptive offsets are transmitted in units of large blocks. If SAO characteristics are distributed differently over small block units, the sample adaptive offsets may be transmitted in units of small blocks. In other words, the block unit in which the SAO is transmitted may be determined variably for each block unit.

Embodiment 3

The embodiment 1 and 2 described above may be used in combination with each other. In other words, the block unit in which SAO is transmitted may be determined selectively between the slice (or picture) unit as in the embodiment 1 and the block unit (for example, CTU/CTB or CU/CB) of a predetermined size to which a picture (or slice) is divided as in the embodiment 2.

Table 3 and 4 illustrate syntax for transmitting the SAO in units of blocks of variable size according to one embodiment of the present invention.

TABLE 3

| slice_segment_header( ) { | Descriptor |
|---|---|
| ... | |
| slice_sao_control_flag | |
| if (slice_sao_control_flag) | |
|    sao_control_depth | ue(v) |
| ... | |

TABLE 4

| coding_tree_unit( ) { | Descriptor |
|---|---|
| ... | |
| if (!slice_sao_control_flag) | |
|    sao_control_cu_depth | ue(v) |
| ... | |

Referring to Table 3 and 4, the slice SAO control flag (slice_sao_control_flag) transmitted from the slice header indicates a flag that indicates whether the SAO is transmitted in units of slices.

In other words, if the slice SAO control flag (slice_sao_control_flag) is 1, the block unit in which the SAO is transmitted may be determined at the level of slice unit by using the SAO control depth (sao_control_depth) syntax as in the embodiment 1. At this time, the implication of the SAO control depth (sao_control_depth) syntax is the same as that described in the embodiment 1.

On the other hand, if the slice SAO control flag (slice_sao_control_flag) is 0, the block unit in which the SAO is transmitted may be determined at the level of CTU unit by using the SAO control CU depth (sao_control_cu_depth) syntax. At this time, the implication of the SAO control CU depth (sao_control_cu_depth) syntax is the same as that described in the embodiment 2.

Embodiment 4

According to the embodiment above, variable transmission of a sample adaptive offset may be determined at the level of slice unit or CTU unit.

However, since the blocks encoded by one CU may exhibit similar block characteristics, it may be inefficient to transmit the SAO separately in a block subdivided by one CU.

Therefore, according to another embodiment of the present invention, the block unit in which the SAO is transmitted may be determined by using the block unit in which the SAO may be transmitted and CU block division information together. In other words, according to the transmission block unit of the SAO defined by the SAO control CU depth syntax (sao_control_cu_depth) (or SAO control depth (sao_control_depth)), the encoder does not always transmit the SAO but may transmit the SAO only when it is smaller than the CU depth. Therefore, the block unit defined by the SAO control CU depth (sao_control_cu_depth) (or SAO control depth (sao_control_depth)) syntax may be referred to as the block unit in which the SAO may be transmitted.

In what follows, more detailed descriptions will be given with reference to the drawings below.

Figure 9:
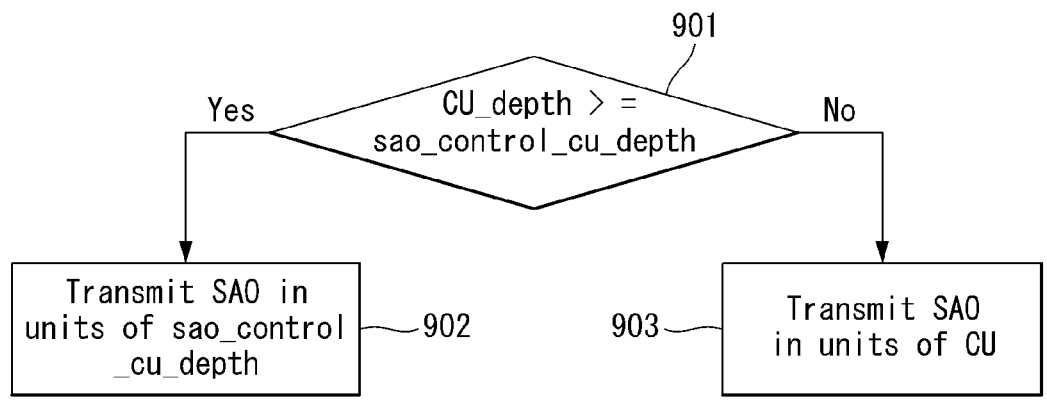
FIG. 9 illustrates a method for determining a unit in which an SAO is transmitted according to one embodiment of the present invention.

FIG. 9 illustrates a method for determining a unit in which an SAO is transmitted according to one embodiment of the present invention.

Referring to FIG. 9, the encoder/decoder determines whether CU depth is equal to or larger than the value specified in the SAO control CU depth (sao_control_cu_depth) (or SAO control depth (sao_control_depth)) syntax S901.

From the determination result of the S901 step, if it is found that the CU depth is equal to or larger than the value specified in the SAO control CU depth (sao_control_cu_depth)(or SAO control depth (sao_control_depth)) syntax, SAO may be transmitted in the block unit according to the value specified by the SAO control CU depth (sao_control_cu_depth)(or SAO control depth (sao_control_depth)) syntax.

On the other hand, from the determination result of the S901 step, if it is found that the CU depth is smaller than the value specified in the SAO control CU depth (sao_control_cu_depth)(or SAO control depth (sao_control_depth)) syntax, SAO may be transmitted in units of CUs.

Figure 10:
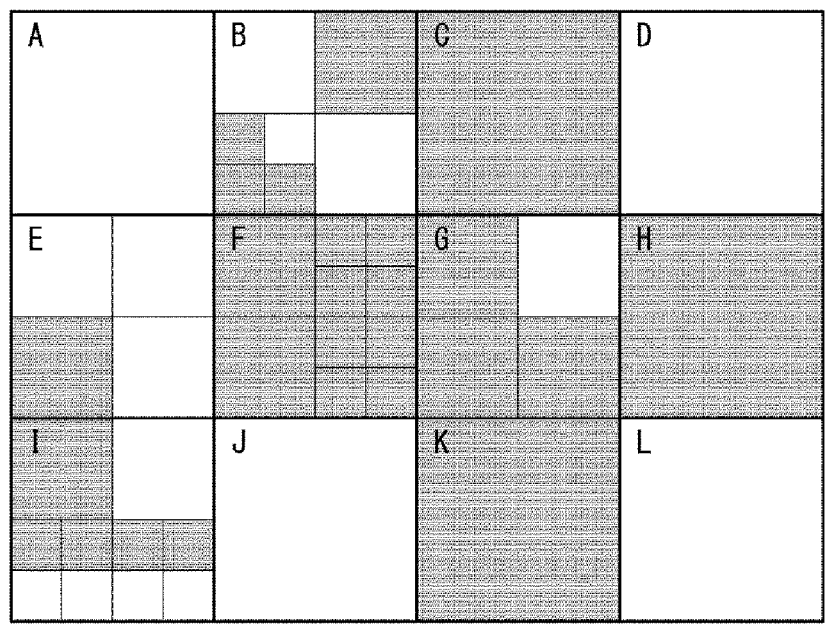
FIG. 10 illustrates a method for transmitting an SAO in a variable block unit according to one embodiment of the present invention.

FIG. 10 illustrates a method for transmitting an SAO in a variable block unit according to one embodiment of the present invention.

FIG. 10 illustrates a method for transmitting a variable SAO by using the SAO control CU depth (sao_control_cu_depth) value and the CU depth value. It is assumed that the SAO control CU depth (sao_control_cu_depth) value is 2.

In FIGS. 10, A, B, C, D, E, F, G, H, I, J, K, and L represent CTUs. Also, in FIG. 10, the shaded blocks represent the blocks for which the SAO is applied whereas those blocks not shaded represent the blocks for which the SAO is not applied.

Since the present example assumes that the SAO control CU depth (sao_control_cu_depth) is 2, if CU depth value is smaller than 2, the SAO may be transmitted in units of CUs rather than using the SAO control CU depth (sao_control_cu_depth) value. Here, if the CU depth value is 0, it indicates that the CU is a block of the same size as the CTU; if the CU depth value is 1, it indicates that the CTU is subdivided into four CUs in the form of quadtree.

In FIGS. 10, A, C, D, H, J, K, and L block corresponds to CUs with a CU depth value of zero. In this case, since the CU depth (=0) is smaller than the SAO control CU depth (sao_control_cu_depth) value, the SAO may be transmitted in the units of CUs.

Also, the upper-left/upper-right/lower-right block subdivided in the form of quadtree from the B block, the four blocks subdivided in the form of quadtree from the E block, the upper-left/lower-left block subdivided in the form of quadtree from the F block, and the upper-left/upper-right block subdivided in the form of quadtree from the I block correspond to CUs with a CU depth value of 1. In this case, since the CU depth (=1) is smaller than the SAO control CU depth (sao_control_cu_depth) value, the SAO may be transmitted in units of CUs.

Meanwhile, when the CU depth value is equal to or larger than 2, the SAO may be transmitted in block units according to the SAO control CU depth (sao_control_cu_depth) syntax.

In FIG. 10, the four blocks further subdivided in the form of quadtree from the lower-left block subdivided in the form of quadtree from the B block, the individual four blocks further subdivided in the form of quadtree from the upper-right/lower-right block subdivided in the form of quadtree from the F block, and the individual four blocks further subdivided in the form of quadtree from the lower-left/lower-right block subdivided in the form of quadtree from the I block correspond to CUs with a CU depth value of 2. In this case, since the CU depth (=2) is equal to the SAO control CU depth (sao_control_cu_depth) value, the SAO may be transmitted in block units according to the SAO control CU depth (sao_control_cu_depth) value. Also, although not shown in FIG. 10, the SAO may also be transmitted in block units according to the SAO control CU depth (sao_control_cu_depth) in the case of a CU depth of 3.

Meanwhile, for the convenience of descriptions, the embodiments above assume that the block unit and/or CU in which the SAO is transmitted is subdivided in the form of quadtree with respect to the CTU; however, the present invention may also be applied to the case in which the block unit and/or CU is subdivided in a different form rather than the quadtree. For example, the CTU may be subdivided recursively in half of the size in the horizontal or vertical direction. In this case, when a division depth is 1, the CTU may be subdivided in half of the size in the horizontal or vertical direction. Also, if the division depth is 2, the block subdivided from the CTU may be further subdivided in half in the horizontal or vertical direction. For the case where the division depth is 3 or more, subdivision may be performed in the same manner as above.

Figure 11:
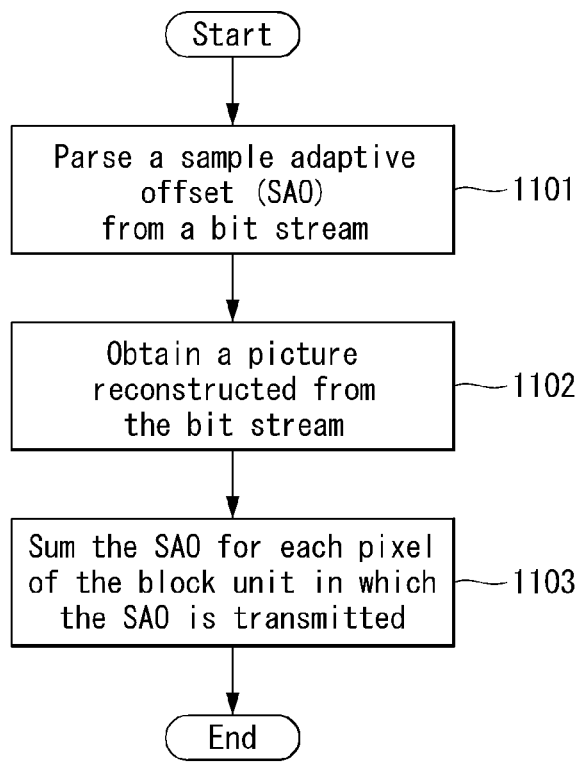
FIG. 11 illustrates a method for decoding an image according to one embodiment of the present invention.

FIG. 11 illustrates a method for decoding an image according to one embodiment of the present invention.

Referring to FIG. 11, the decoder parses the SAO from a bit stream outputted from the encoder in block units in which the SAO is transmitted (namely first block unit), S1101.

Here, SAO may correspond to an edge offset or band offset.

The block unit in which the SAO is transmitted by the encoder may be determined variably according to the methods described in the embodiment 1 to 4.

As described in the embodiment 1, the first block unit in which the SAO is transmitted may be determined separately for each picture or slice. In this case, a step of parsing information about the first block unit from a bit stream outputted from the encoder before the S1101 step may be further included. For example, information about the first block unit may be transmitted from within a slice header, PPS, SPS, or VPS.

Similarly, as described in the embodiment 2, the first block unit may be determined separately for each second block of a predetermined size (for example, CTU or CTB) to which a picture or a slice is subdivided. In this case, a step of parsing information about the first block unit from a bit stream outputted from the encoder before the S1101 step may be further included. For example, information about the first block unit may be transmitted in units of second blocks (namely transmitted according to the syntax of the second block unit).

Similarly, as described in the embodiment 3, the first block unit may be determined separately for each picture or slice or determined separately for each second block of a predetermined size (for example, CTU or CTB) into which a picture or a slice is subdivided. In this case, a step of parsing a flag indicating whether the first block unit is determined for each picture or slice from a bit stream outputted from the encoder before the S1101 step may be further included and/or a step of parsing information about the first block unit from a bit stream outputted from the encoder may further be included.

Similarly, as described in the embodiment 4, a block unit in which the SAO may be transmitted (namely a third block unit), and the first block unit in which the SAO is transmitted may be determined according to the relationship between the size of the third block unit and the size of an encoding unit (for example, CU or CB). In this case, a step of parsing information about the third block unit in which the SAO may be transmitted from a bit stream outputted from the encoder before the S1101 step may be further included.

At this time, if the size of an encoding unit (for example, CU or CB) is equal to or smaller than the size of the third block unit, the third block unit may be determined as the first block unit. In other words, the SAO may be determined in third block units.

Meanwhile, if the size of an encoding unit (for example, CU or CB) is larger than the size of the third block unit, the encoding unit may be determined as the first block unit. In other words, the SAO may be transmitted in the encoding units.

The decoder obtains a picture reconstructed from a bit stream outputted from the encoder S1102.

For example, the decoder may obtain a residual signal through the dequantization and inverse transform process described in FIG. 2 and obtain a reconstructed picture by summing the residual signal and prediction signal (intra-prediction and inter-prediction signal).

The decoder applies the SAO to the reconstructed picture by summing the SAO parsed for each pixel of the block unit (namely the first block unit) in which the SAO is transmitted in the reconstructed picture S1103.

In other words, the block unit in which the SAO is transmitted may be determined to be the same as the block unit for which the SAO is applied. Therefore, the decoder may apply the SAO received with respect to a block in which the SAO is transmitted.

At this time, the decoder may apply deblocking filtering to the reconstructed picture and apply the SAO to the reconstructed picture for which the deblocking filtering has been applied.

Figure 12:
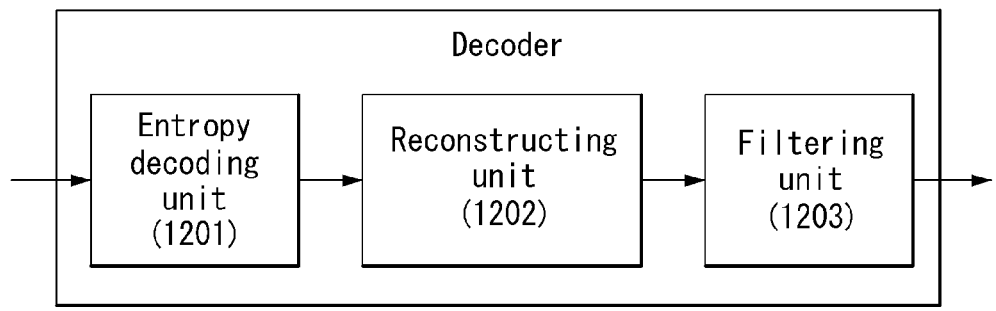
FIG. 12 illustrates a decoder according to one embodiment of the present invention.

FIG. 12 illustrates a decoder according to one embodiment of the present invention.

Referring to FIG. 12, the decoder implements functions, processes and/or methods proposed in FIGS. 5 to 11. More specifically, the decoder may comprise an entropy decoding unit 1201, reconstructing unit 1202, and filtering unit 1203.

The specific structure of the decoder illustrated in FIG. 12 is only an example; part of the decoder structure illustrated in FIG. 12 may be employed in another structure of the decoder, or the decoder may be implemented so that any one of the decoder structure is implemented being separated from the others in terms of its functionality; and a different structure not shown in FIG. 12 may also be added to implement the decoder.

The entropy decoding unit 1201 parses the SAO in block units (namely first block units) in which the SAO is transmitted from a bit stream outputted from the encoder.

At this time, the SAO may correspond to an edge offset or band offset.

According to the methods described in the embodiment 1 to 4, the block unit in which the SAO is transmitted by the encoder may be determined variably.

As described in the embodiment 1, the first block unit in which the SAO is transmitted may be determined separately for each picture or slice. In this case, a step of parsing information about the first block unit from a bit stream outputted from the encoder before the S1101 step may be further included. For example, information about the first block unit may be transmitted from within a slice header, PPS, SPS, or VPS.

Similarly, as described in the embodiment 2, the first block unit may be determined separately for each second block of a predetermined size (for example, CTU or CTB) to which a picture or a slice is subdivided. In this case, a step of parsing information about the first block unit from a bit stream outputted from the encoder before the S1101 step may be further included. For example, information about the first block unit may be transmitted in units of second blocks (namely transmitted according to the syntax of the second block unit).

Similarly, as described in the embodiment 3, the first block unit may be determined separately for each picture or slice or determined separately for each second block of a predetermined size (for example, CTU or CTB) into which a picture or a slice is subdivided. In this case, a step of parsing a flag indicating whether the first block unit is determined for each picture or slice from a bit stream outputted from the encoder before the S1101 step may be further included and/or a step of parsing information about the first block unit from a bit stream outputted from the encoder may further be included.

Similarly, as described in the embodiment 4, a block unit in which the SAO may be transmitted (namely a third block unit), and the first block unit in which the SAO is transmitted may be determined according to the relationship between the size of the third block unit and the size of an encoding unit (for example, CU or CB). In this case, a step of parsing information about the third block unit in which the SAO may be transmitted from a bit stream outputted from the encoder before the S1101 step may be further included.

At this time, if the size of an encoding unit (for example, CU or CB) is equal to or smaller than the size of the third block unit, the third block unit may be determined as the first block unit. In other words, the SAO may be determined in third block units.

Meanwhile, if the size of an encoding unit (for example, CU or CB) is larger than the size of the third block unit, the encoding unit may be determined as the first block unit. In other words, the SAO may be transmitted in the encoding units.

The reconstructing unit 1202 obtains a picture reconstructed from a bit stream outputted from the encoder.

For example, the decoder may obtain a residual signal through the dequantization and inverse transform process described in FIG. 2 and obtain a reconstructed picture by summing the residual signal and prediction signal (intra-prediction and inter-prediction signal).

The filtering unit 1203 applies the SAO to the reconstructed picture by summing the SAO parsed for each pixel of the block unit (namely the first block unit) in which the SAO is transmitted in the reconstructed picture.

In other words, the block unit in which the SAO is transmitted may be determined to be the same as the block unit for which the SAO is applied. Therefore, the decoder may apply the SAO received with respect to a block in which the SAO is transmitted.

At this time, the decoder may apply deblocking filtering to the reconstructed picture and apply the SAO to the reconstructed picture for which the deblocking filtering has been applied.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

So far, the preferred embodiments of the present invention described above are disclosed as examples, and may be modified, changed, substituted or added by other various embodiments within the inventive concept and scope of the present invention described in the enclosed claims below by those skilled person in the art.

The invention claimed is:

1. A method for decoding an image, the method comprising:
parsing, from a bit stream outputted from an encoder, a Sample Adaptive Offset (SAO) in first block units in which the SAO is transmitted;
obtaining a reconstructed picture from the bit stream;
summing the SAO parsed to each pixel in the first block units for the reconstructed picture, wherein the first block unit is determined variably by the encoder, and
parsing, from the bit stream, information about a third block unit in which the SAO can be transmitted,
wherein, if the size of an encoding unit within the reconstructed image is equal to or smaller than the size of the third block unit, the third block unit is determined as the first block unit; otherwise, the encoding unit is determined as the first block unit.

2. The method of claim 1, further comprising:
parsing information about the first block unit from the bit stream.

3. The method of claim 2, wherein the first block unit is determined separately for each picture or slice.

4. The method of claim 3, wherein information about the first block unit is transmitted from within a slice header, picture parameter set (PPS), sequence parameter set (SPS), or video parameter set (VPS).

5. The method of claim 2, wherein the first block unit is determined separately for each second block of a predetermined size to which a picture or a slice is partitioned.

6. The method of claim 5, wherein information about the first block unit is transmitted in units of the second block.

7. The method of claim 2, further comprising:
parsing a flag indicating whether the first block unit is determined in units of picture or slice,
wherein the first block unit is determined separately for each picture or slice according to the flag value or determined separately for each second block of a predetermined size by which a picture or a slice is partitioned.

8. A device for decoding an image, the device comprising:
an entropy decoding unit for parsing, from a bit stream outputted from an encoder, a Sample Adaptive Offset (SAO) in first block units in which the SAO is transmitted;
a reconstructing unit for obtaining a reconstructed picture from the bit stream; and
a filtering unit for summing the SAO parsed to each pixel in the first block units for the reconstructed picture, wherein the first block unit is determined variably by the encoder,
wherein the entropy decoding unit further parses, from the bit stream, information about a third block unit in which the SAO can be transmitted, and
wherein, if the size of an encoding unit within the reconstructed image is equal to or smaller than the size of the third block unit, the third block unit is determined as the first block unit; otherwise, the encoding unit is determined as the first block unit.

* * * * *